US012731523B1

United States Patent
Zheng et al.

(10) Patent No.: US 12,731,523 B1
(45) Date of Patent: Sep. 8, 2026

(54) GATE DRIVING DEVICE FOR DYNAMICALLY ADJUSTING REFRESH RATE OF EACH DISPLAY AREA OF DISPLAY PANEL

(71) Applicant: LITEMAX ELECTRONICS INC., New Taipei City (TW)

(72) Inventors: Guang-Ting Zheng, New Taipei City (TW); Po-Tsun Liu, New Taipei City (TW); Xin-Ya Lai, New Taipei City (TW)

(73) Assignee: LITEMAX ELECTRONICS INC., New Taipei City (TW)

( * ) Notice: Subject to any disclaimer, the term of this patent is extended or adjusted under 35 U.S.C. 154(b) by 0 days.

(21) Appl. No.: 19/432,178

(22) Filed: Dec. 24, 2025

(30) Foreign Application Priority Data

Jun. 12, 2025 (TW) ................................ 114122030

(51) Int. Cl.
*G09G 3/20* (2006.01)

(52) U.S. Cl.
CPC ... *G09G 3/2092* (2013.01); *G09G 2300/0408* (2013.01); *G09G 2310/0245* (2013.01); *G09G 2310/0267* (2013.01); *G09G 2330/021* (2013.01)

(58) Field of Classification Search
CPC ............... G09G 3/3266; G09G 3/3674; G09G 2310/02; G09G 2310/0202; G09G 2310/0264
See application file for complete search history.

(56) References Cited

U.S. PATENT DOCUMENTS

| | | | | | |
|---|---|---|---|---|---|
| 2020/0388228 | A1* | 12/2020 | Oh | ........................ | G09G 3/3266 |
| 2024/0221651 | A1* | 7/2024 | Park | ...................... | G09G 3/3266 |
| 2025/0273161 | A1* | 8/2025 | Park | ...................... | G09G 3/3266 |

* cited by examiner

*Primary Examiner* — Kevin M Nguyen

(57) ABSTRACT

A gate driving device includes a plurality of gate driving units. An $n^{th}$ stage gate driving unit includes a frequency increasing circuit, a frequency decreasing circuit and an output circuit. The frequency increasing circuit respectively adjusts, during a frequency-up drive period, voltage levels of a pre-charge node and a pull-down node to have a high voltage level and a low voltage level. The frequency decreasing circuit respectively adjusts, during a frequency reduction drive period, the voltage levels of the pre-charge node and the pull-down node to have the low voltage level and the high voltage level. The output circuit generates an $n^{th}$ stage gate drive signal and an $n^{th}$ stage carry signal with an adjustable quantity of pulses in a frame display cycle based on an $n^{th}$ stage clock signal, an $(n+m)^{th}$ stage carry signal and the voltage levels of the pre-charge node and the pull-down node.

11 Claims, 5 Drawing Sheets

GATE DRIVING DEVICE FOR DYNAMICALLY ADJUSTING REFRESH RATE OF EACH DISPLAY AREA OF DISPLAY PANEL

CROSS-REFERENCE TO RELATED APPLICATION

This non-provisional application claims priority under 35 U.S.C. § 119(a) on patent application No. 114122030 filed in Taiwan, R.O.C. on Jun. 12, 2025, the entire contents of which are hereby incorporated by reference.

BACKGROUND OF THE INVENTION

1. Field of the Invention

The present disclosure relates to a driving device, and in particular, to a gate driving device for dynamically adjusting a refresh rate of each display area of a display panel.

2. Description of the Related Art

An existing display mainly includes a display panel, a source driving device, and a gate driving device. The display panel includes a plurality of pixel circuits, and the source driving device provides a plurality of display data signals to the pixel circuits respectively through the plurality of source lines. The gate driving device provides a plurality of gate drive signals (or referred to as scanning signals) to the pixel circuits respectively through a plurality of gate lines, to drive the corresponding pixel circuits. As the concept of a system-on-glass (SOG) panel is continuously put forward, in recent years, in many products, the gate driving device in the display is integrated on a glass substrate, that is, implemented through a design of a gate driver on array (GOA). The GOA has many advantages. In addition to reducing a quantity of conventional gate driving chip wirings to reduce manufacturing costs, the GOA can further achieve a narrow frame design, thereby improving a screen ratio and market competitiveness of the display.

BRIEF SUMMARY OF THE INVENTION

However, a plurality of gate drive signals outputted by the existing gate driving device are usually designed with a fixed switching frequency. Consequently, refresh rates of a display panel in a plurality of display areas of a same display picture are the same. In other words, the entire display picture of the display panel is synchronously refreshed. The refresh rate of the display panel in the same display picture cannot be improved in a display area with a high dynamic change. Consequently, overall display quality of the display panel cannot be improved, unnecessary refresh cannot be reduced in a display area with a static or low dynamic change, and unnecessary dynamic power consumption cannot be effectively reduced. In this way, as demands of consumers for a display with a high resolution and a high refresh rate continue to increase, power consumption of the display also increases accordingly, causing the display to have poor energy efficiency.

Therefore, how to provide a gate driving device that can dynamically adjust the refresh rate according to requirements of different display areas, so that the display area with the high dynamic change has a high refresh rate, to improve the overall display quality of the display panel, and the display area with the static or low dynamic change reduces the refresh rate, to reduce the dynamic power consumption. Therefore, it is crucial for effectively regulating the dynamic power consumption and improving energy efficiency of the display.

In view of this, the present disclosure provides a novel gate driving device, which can effectively solve the foregoing problems.

The gate driving device for dynamically adjusting a refresh rate of each display area of a display panel in the present disclosure includes: a plurality of gate driving units, where an $n^{th}$ stage gate driving unit in the gate driving units includes: a frequency increasing circuit, coupled to a pre-charge node and a pull-down node, and configured to respectively adjust, based on a system high voltage, an $(n-m)^{th}$ stage carry signal, and a frequency-up indication signal during a frequency-up drive period, a voltage level of the pre-charge node and a voltage level of the pull-down node to have a high voltage level and a low voltage level, where the frequency-up indication signal changes with a high-speed change of each image region of a to-be-displayed picture, each of n and m is a positive integer, and n−m is greater than or equal to 1; a frequency decreasing circuit, coupled to the pre-charge node and the pull-down node, and configured to respectively adjust, based on a mask signal and an $(n-m)^{th}$ stage clock signal during a frequency reduction drive period, the voltage level of the pre-charge node and the voltage level of the pull-down node to have the low voltage level and the high voltage level, where the mask signal changes with a low-speed change of each image region of the to-be-displayed picture; and an output circuit, coupled to the pre-charge node and having the pull-down node, where the output circuit is configured to generate an $n^{th}$ stage gate drive signal and an $n^{th}$ stage carry signal based on an $n^{th}$ stage clock signal, an $(n+m)^{th}$ stage carry signal, the voltage level of the pre-charge node, and the voltage level of the pull-down node, a quantity of pulses of the $n^{th}$ stage gate drive signal in a frame display cycle changes with changes of the $n^{th}$ stage clock signal, the $(n+m)^{th}$ stage carry signal, the voltage level of the pre-charge node, and the voltage level of the pull-down node.

In an embodiment, the gate driving device described above includes: during the frequency-up drive period, the output circuit increases the quantity of pulses of the $n^{th}$ stage gate drive signal in the frame display cycle based on the $n^{th}$ stage clock signal, the $(n+m)^{th}$ stage carry signal, the voltage level of the pre-charge node, and the voltage level of the pull-down node; and during the frequency reduction drive period, the output circuit reduces the quantity of pulses of the $n^{th}$ stage gate drive signal in the frame display cycle based on the $n^{th}$ stage clock signal, the $(n+m)^{th}$ stage carry signal, the voltage level of the pre-charge node, and the voltage level of the pull-down node.

In an embodiment, according to the gate driving device described above, the frequency increasing circuit includes: a frequency-up unit, coupled to the pre-charge node, and configured to adjust, based on the system high voltage, the $(n-m)^{th}$ stage carry signal, and the frequency-up indication signal during the frequency-up drive period, the voltage level of the pre-charge node to have the high voltage level, to enable the voltage level of the pull-down node to be adjusted to have the low voltage level; and a frequency-up end unit, coupled to the pull-down node, and configured to adjust, based on a frequency-up end signal and the $(n-m)^{th}$ stage clock signal when the frequency-up drive period ends, the voltage level of the pull-down node to have the high voltage level, to enable the voltage level of the pre-charge node to be adjusted to have the low voltage level.

In an embodiment, according to the gate driving device described above, the frequency-up unit includes: a first transistor, having a first end receiving the frequency-up indication signal, a second end, and a control end receiving the $(n-m)^{th}$ stage carry signal; a second transistor, having a first end coupled to the second end of the first transistor, a second end, and a control end receiving the $(n-m)^{th}$ stage carry signal; a third transistor, having a first end coupled to the second end of the second transistor, a second end, and a control end receiving the frequency-up indication signal; a fourth transistor, having a first end receiving the system high voltage, a second end coupled to the pre-charge node, and a control end coupled to the second end of the third transistor; and a first capacitor, coupled between the first end of the third transistor and a system low voltage.

In an embodiment, according to the gate driving device described above, the frequency-up end unit includes: a fifth transistor, having a first end coupled to the pull-down node, a second end, and a control end receiving the frequency-up end signal; and a sixth transistor, having a first end coupled to the second end of the fifth transistor, a second end, and a control end coupled to the second end of the sixth transistor and receiving the $(n-m)^{th}$ stage clock signal.

In an embodiment, according to the gate driving device described above, the frequency decreasing circuit includes: a frequency reduction unit, coupled to the pull-down node, and configured to adjust, based on the mask signal and the $(n-m)^{th}$ stage clock signal during the frequency reduction drive period, the voltage level of the pull-down node to have the high voltage level, to enable the voltage level of the pre-charge node to be adjusted to have the low voltage level; and a frequency reduction end unit, coupled to the pre-charge node, and configured to adjust, based on the system high voltage, the $(n-m)^{th}$ stage carry signal, and a frequency reduction end signal when the frequency reduction drive period ends, the voltage level of the pre-charge node to have the high voltage level.

In an embodiment, according to the gate driving device described above, the frequency reduction unit includes: a seventh transistor, having a first end, a second end, and a control end coupled to the second end of the seventh transistor and receiving the $(n-m)^{th}$ stage clock signal; and an eighth transistor, having a first end coupled to the second end of the seventh transistor, a second end coupled to the pull-down node, and a control end receiving the mask signal.

In an embodiment, the gate driving device described above includes: a ninth transistor, having a first end receiving the frequency reduction end signal, a second end, and a control end receiving the $(n-m)^{th}$ stage carry signal; a tenth transistor, having a first end coupled to the second end of the ninth transistor, a second end, and a control end receiving the $(n-m)^{th}$ stage carry signal; an eleventh transistor, having a first end coupled to the second end of the tenth transistor, a second end, and a control end receiving the frequency reduction end signal; a twelfth transistor, having a first end coupled to the pre-charge node, a second end receiving the system high voltage, and a control end coupled to the second end of the eleventh transistor; and a second capacitor, coupled between the first end of the eleventh transistor and a system low voltage.

In an embodiment, the gate driving device described above further includes: a control unit, coupled to the gate driving units, and configured to generate the frequency-up indication signal, the frequency-up end signal, the mask signal, and the frequency reduction end signal based on image data of the to-be-displayed picture.

In an embodiment, according to the gate driving device described above, the $n^{th}$ stage gate driving unit further includes: a power supply circuit, coupled to a pre-charge node, and configured to charge a low voltage value of the pre-charge node to the high voltage value based on the $(n-m)^{th}$ stage carry signal and the system high voltage during a normal drive period.

In an embodiment, according to the gate driving device described above, the output circuit includes: an anti-noise control unit, coupled to the pre-charge node and having the pull-down node, where the anti-noise control unit is configured to adjust, based on the system high voltage and the voltage level of the pre-charge node, the voltage level of the pull-down node to have the low voltage level or the high voltage level; an anti-noise unit, coupled to the pre-charge node and the pull-down node, where the anti-noise unit is in a work state when the voltage level of the pull-down node has the high voltage level, to enable each of the $n^{th}$ stage gate drive signal and the $n^{th}$ stage carry signal to have a low potential, and the anti-noise unit is in a non-work state when the voltage level of the pull-down node has the low voltage level; a pull-down unit, coupled to the pre-charge node, and configured to pull down the voltage level of the pre-charge node and a potential of the $n^{th}$ stage gate drive signal to a system low voltage based on the $(n+m)^{th}$ stage carry signal, to enable the anti-noise control unit to adjust the voltage level of the pull-down node to have the high voltage level; and an output unit, coupled to the pre-charge node, the anti-noise unit, and the pull-down unit, and configured to generate the $n^{th}$ stage gate drive signal and the $n^{th}$ stage carry signal based on the $n^{th}$ stage clock signal, the voltage level of the pre-charge node, and a turned-on or turn-off state of each of the anti-noise unit and the pull-down unit.

The effects of the present disclosure are as follows. A gate driving device can increase a refresh rate in a display area with a high dynamic change by using a frequency increasing circuit, to improve overall display quality of a display panel in a display, and the gate driving device can decrease a refresh frequency in a display area with a static or low dynamic change by using a frequency decreasing circuit, thereby reducing unnecessary times of charging and discharging, reducing dynamic power consumption, optimizing control of the dynamic power consumption, and improving energy efficiency of the display.

DETAILED DESCRIPTION OF THE INVENTION

In the present disclosure, the content of the present disclosure is described in detail by using the following embodiments and accompanying drawings, to help a person of ordinary skill in the technical field of the present disclosure understand the objectives, features, and effects of the present disclosure. It should be noted that, in the following descriptions and the patent scope of this application, the terms "include" and "comprise" are used in an open-ended manner, so that the terms should not be interpreted as closed terms such as "consist of". In addition, the term "coupled" is intended to indicate indirect or direct coupling. Therefore, if a device is coupled to another device, the connection may be through direct coupling, or indirect coupling through another device and connection. In addition, in the content of the present disclosure, the terms such as "first", "second", and "third" are used to distinguish between components/signals, but are not used to limit the components/signals or indicate a specific sequence of the components/signals.

Figure 1:
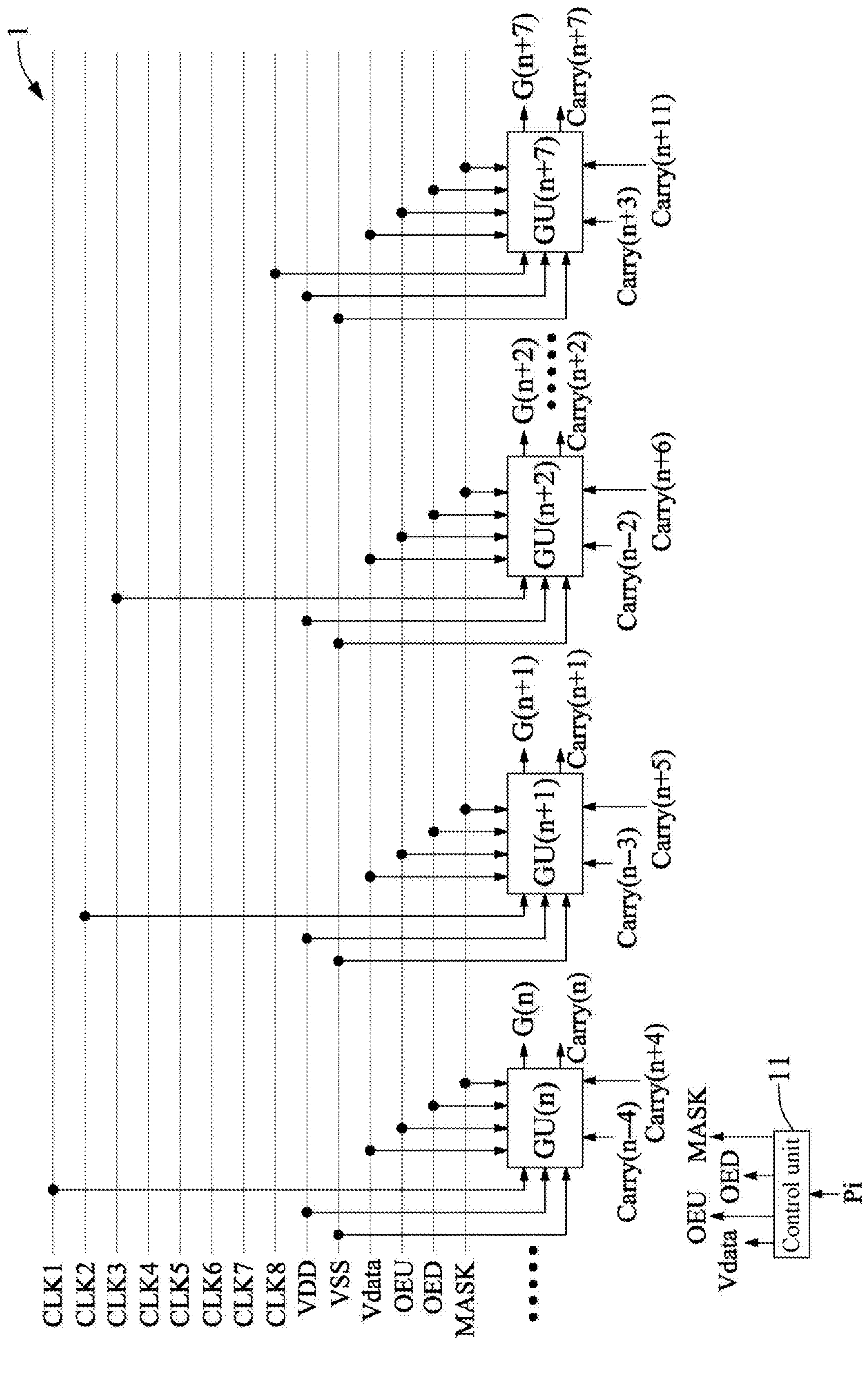
FIG. 1 is a block diagram of an embodiment of a gate driving device according to the present disclosure.

Referring to FIG. 1, FIG. 1 is a block diagram of an embodiment of a gate driving device for dynamically adjusting a refresh rate of each display area of a display panel according to the present disclosure. In this embodiment, a gate driving device 1 includes a plurality of gate driving units (which are represented by an $n^{th}$ stage gate driving unit GU(n) to an $(n+7)^{th}$ stage gate driving unit GU(n+7) in FIG. 1) and a control unit 11. The gate driving device 1 is integrated on a glass substrate, is implemented through a design of a gate driver on array (GOA). For example, in the gate driving units (GU(n) to GU(n+7)), the $n^{th}$ stage gate driving unit GU(n) may provide an $n^{th}$ stage gate drive signal G(n) and an $n^{th}$ stage carry signal Carry(n) based on an $n^{th}$ stage clock signal (which is represented by a clock signal CLK1 in external clock signals CLK1 to CLK8 in FIG. 1), a system high voltage VDD, a frequency-up indication signal Vdata, a frequency-up end signal OEU, a frequency reduction end signal OED, a mask signal MASK, an $(n-4)^{th}$ stage carry signal Carry(n−4), and an $(n+4)^{th}$ stage carry signal Carry(n+4). An $(n+1)^{th}$ stage gate driving unit GU(n+1) may provide an $(n+1)^{th}$ stage gate drive signal G(n+1) and an $(n+1)^{th}$ stage carry signal Carry(n+1) based on an $(n+1)^{th}$ stage clock signal (which is represented by a clock signal CLK2 in external clock signals CLK1 to CLK8 in FIG. 1), the system high voltage VDD, the frequency-up indication signal Vdata, the frequency-up end signal OEU, the frequency reduction end signal OED, the mask signal MASK, an $(n-3)^{th}$ stage carry signal Carry(n−3), and an $(n+5)^{th}$ stage carry signal Carry(n+5). Operations of an $(n+2)^{th}$ stage gate driving unit GU(n+2) to an $(n+7)^{th}$ stage gate driving unit GU(n+7) are deduced by analogy. The $(n-4)^{th}$ stage carry signal Carry(n−4) is from an $(n-4)^{th}$ stage gate driving unit (not shown in the figure), the $(n+4)^{th}$ stage carry signal Carry(n+4) is from an $(n+4)^{th}$ stage gate driving unit (not shown in the figure), the $(n-3)^{th}$ stage carry signal Carry(n−3) is from an $(n-3)^{th}$ stage gate driving unit (not shown in the figure), and the $(n+5)^{th}$ stage carry signal Carry(n+5) is from an $(n+5)^{th}$ stage gate driving unit (not shown in the figure). The mask signal MASK is a control signal configured to mask a column of gate drive signals. When the mask signal MASK is at a high potential, a column of driving segments of the gate driving device 1 may be prevented from generating a gate drive signal having a high potential, even if a transistor of a corresponding column is turned off.

The control unit 11 is coupled to the $n^{th}$ stage gate driving unit GU(n) to the $(n+7)^{th}$ stage gate driving unit GU(n+7), and generates the frequency-up indication signal Vdata, the frequency-up end signal OEU, the frequency reduction end signal OED, and the mask signal MASK based on image data Pi of a to-be-displayed picture. The control unit 11 may be a logic circuit or may be implemented by a time sequence control circuit in a display (not shown in the figure). The control unit 11 may alternatively be a controller, a processor, a microprocessor, a control IC, or the like, but this is not limited thereto. The frequency-up indication signal Vdata changes with a high-speed change of each image region of the to-be-displayed picture. For example, when there is an image region of the to-be-displayed picture that changes at a high speed, the frequency-up indication signal Vdata has a high potential, so that a gate driving unit corresponding to the image region performs an operation of a frequency-up function to improve a display frequency (or referred to as a refresh rate) of a gate drive signal generated by the gate driving unit. When there is no image region of the to-be-displayed picture that changes at a high speed (that is, the image region changes at a low speed or is static), the frequency-up indication signal Vdata has a low potential, so that a corresponding gate driving unit does not perform the operation of the frequency-up function, but this is not limited thereto. The mask signal MASK changes with a low-speed change (or a static state) of each image region of the to-be-displayed picture. For example, when there is an image region of the to-be-displayed picture that changes at a low speed (or is static), the mask signal MASK has a high potential, so that the gate driving unit corresponding to the image region performs an operation of a frequency reduction function, to reduce a display frequency of the gate drive signal generated by the gate driving unit. When there is no image region of the to-be-displayed picture changes at a low speed (or is static), the mask signal MASK has a low potential, so that the corresponding gate driving unit does not perform the operation of the frequency reduction function, but this is not limited thereto.

Figure 2:
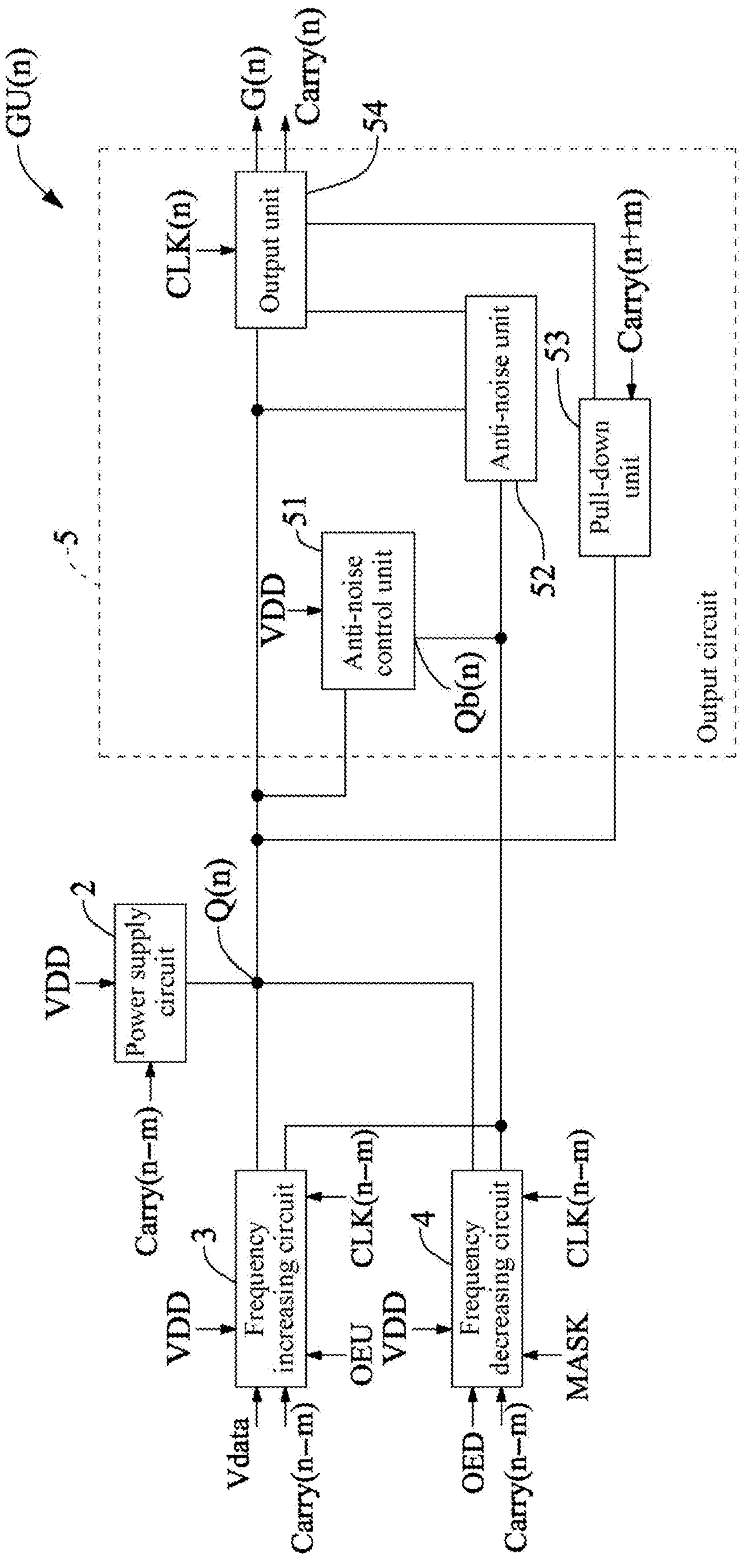
FIG. 2 is a block diagram of an $n^{th}$ stage gate driving unit according to this embodiment.
Figure 3:
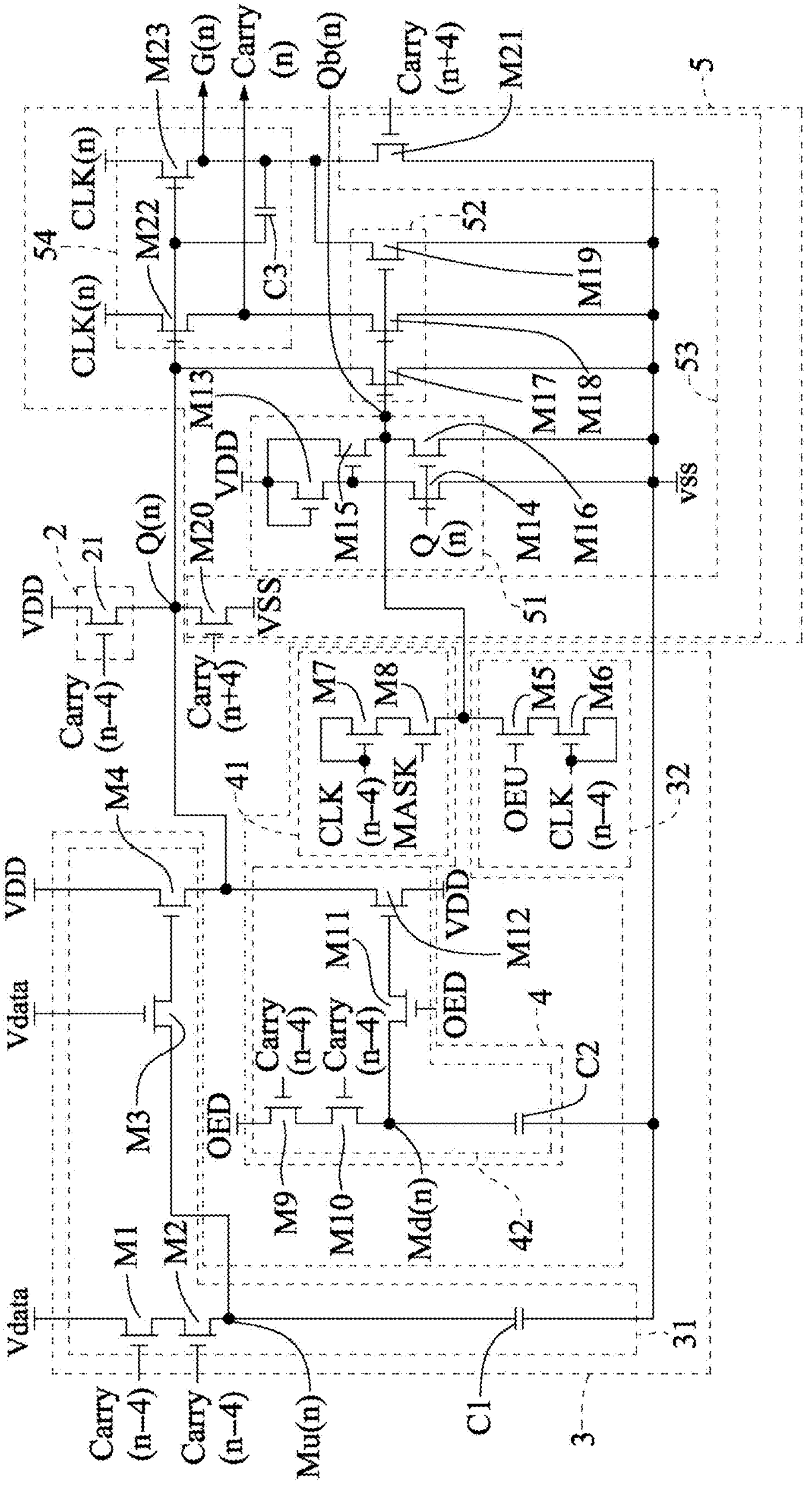
FIG. 3 is a circuit diagram of an $n^{th}$ stage gate driving unit according to this embodiment.

Referring to FIG. 2 and FIG. 3, FIG. 2 is a block diagram of an $n^{th}$ stage gate driving unit according to this embodiment, and FIG. 3 is a circuit diagram of an $n^{th}$ stage gate driving unit according to this embodiment. In this embodiment, the $n^{th}$ stage gate driving unit GU(n) includes a power supply circuit 2, a frequency increasing circuit 3, a frequency decreasing circuit 4, and an output circuit 5.

The power supply circuit 2 is coupled to a pre-charge node Q(n), and charges, during a normal drive period, a low voltage value of the pre-charge node Q(n) to a high voltage value based on an $(n-m)^{th}$ stage carry signal Carry(n−m) and the system high voltage VDD. Each of n and m is a positive integer, and n−m is greater than or equal to 1. In this embodiment, m is, for example, equal to 4, but a value of m is not limited in the present disclosure. In FIG. 3, m in FIG. 2 is represented by 4 (for example, Carry(n−m) is represented by Carry(n−4)). The power supply circuit 2 includes a transistor 21, and the transistor 21 has a first end receiving the system high voltage VDD, a second end coupled to the pre-charge node Q(n), and a control end receiving the $(n-4)^{th}$ stage carry signal Carry(n−4).

The frequency increasing circuit 3 is coupled to the pre-charge node Q(n) and a pull-down node Qb(n), and respectively adjusts, based on the system high voltage VDD, the $(n-m)^{th}$ stage carry signal Carry(n−m), and a frequency-up indication signal Vdata during a frequency-up drive period, a voltage level of the pre-charge node Q(n) and a voltage level of the pull-down node Qb(n) to have a high voltage level and a low voltage level. In this embodiment, the frequency increasing circuit 3 includes a frequency-up unit 31 and a frequency-up end unit 32.

The frequency-up unit 31 is coupled to the pre-charge node Q(n), and adjusts, based on the system high voltage VDD, the $(n-4)^{th}$ stage carry signal Carry(n−4), and the frequency-up indication signal Vdata during the frequency-up drive period, the voltage level of the pre-charge node Q(n) to have the high voltage level (that is, each of the corresponding $(n-4)^{th}$ stage carry signal Carry(n−4) and the frequency-up indication signal Vdata has a high potential), so that the voltage level of the pull-down node Qb(n) is adjusted to have the low voltage level. In this embodiment, the frequency-up unit 31 includes a first transistor M1, a second transistor M2, a third transistor M3, a fourth transistor M4, and a first capacitor C1.

The first transistor M1 has a first end receiving the frequency-up indication signal Vdata, a second end, and a control end receiving the $(n-4)^{th}$ stage carry signal Carry (n−4). The second transistor M2 has a first end coupled to the second end of the first transistor M1, a second end, and a control end receiving the $(n-4)^{th}$ stage carry signal Carry (n−4). The third transistor M3 has a first end coupled to the second end of the second transistor M2, a second end, and a control end receiving the frequency-up indication signal Vdata. The fourth transistor M4 has a first end receiving the system high voltage VDD, a second end coupled to the pre-charge node Q(n), and a control end coupled to the second end of the third transistor M3. The first capacitor C1 is coupled between the first end of the third transistor M3 and a system low voltage VSS.

The frequency-up end unit 32 is coupled to the pull-down node Qb(n), and adjusts, based on the frequency-up end signal OEU and the $(n-4)^{th}$ stage clock signal CLK(n−4) when the frequency-up drive period ends, the voltage level of the pull-down node Qb(n) to have the high voltage level (that is, correspondingly, each of the frequency-up end signal OEU and the $(n-4)^{th}$ stage clock signal CLK(n−4) has a high potential), so that the voltage level of the pre-charge node Q(n) is adjusted to have the low voltage level. In this embodiment, the frequency-up end unit 32 includes a fifth transistor M5 and a sixth transistor M6.

The fifth transistor M5 has a first end coupled to the pull-down node Qb(n), a second end, and a control end receiving the frequency-up end signal OEU. The sixth transistor M6 has a first end coupled to the second end of the fifth transistor M5, a second end, and a control end coupled to the second end of the sixth transistor M6 and receiving the $(n-4)^{th}$ stage clock signal CLK(n−4).

The frequency decreasing circuit 4 is coupled to the pre-charge node Q(n) and the pull-down node Qb(n), and respectively adjusts, based on the mask signal MASK and an $(n-m)^{th}$ stage clock signal CLK(n−m) (represented by CLK (n−4) in FIG. 3) during the frequency reduction drive period, the voltage level of the pre-charge node Q(n) and the voltage level of the pull-down node Qb(n) to have the low voltage level and the high voltage level. In this embodiment, the frequency decreasing circuit 4 includes a frequency reduction unit 41 and a frequency reduction end unit 42.

The frequency reduction unit 41 is coupled to the pull-down node Qb(n), and adjusts, based on the mask signal MASK and the $(n-4)^{th}$ stage clock signal CLK(n−4) during the frequency reduction drive period, the voltage level of the pull-down node Qb(n) to have the high voltage level (that is, correspondingly, each of the mask signal MASK and the $(n-4)^{th}$ stage clock signal CLK(n−4) has a high potential), so that the voltage level of the pre-charge node Q(n) is adjusted to have the low voltage level. In this embodiment, the frequency reduction unit 41 includes a seventh transistor M7 and an eighth transistor M8.

The seventh transistor M7 has a first end, a second end, and a control end coupled to the second end of the seventh transistor M7 and receiving the $(n-4)^{th}$ stage clock signal CLK(n−4). The eighth transistor M8 has a first end coupled to the second end of the seventh transistor M7, a second end coupled to the pull-down node Qb(n), and a control end receiving the mask signal MASK.

The frequency reduction end unit 42 is coupled to the pre-charge node Q(n), and adjusts, based on the system high voltage VDD, the $(n-4)^{th}$ stage carry signal Carry(n−4), and the frequency reduction end signal OED when the frequency reduction drive period ends, the voltage level of the pre-charge node Q(n) to have the high voltage level, so that the $n^{th}$ stage gate drive signal G(n) and the $n^{th}$ stage carry signal Carry(n) are restored to be output, thereby completing drive recovery. In this embodiment, the frequency reduction end unit 42 includes a ninth transistor M9, a tenth transistor M10, an eleventh transistor M11, a twelfth transistor M12, and a second capacitor C2.

The ninth transistor M9 has a first end receiving the frequency reduction end signal OED, a second end, and a control end receiving the $(n-4)^{th}$ stage carry signal Carry (n−4). The tenth transistor M10 has a first end coupled to the second end of the ninth transistor M9, a second end, and a control end receiving the $(n-4)^{th}$ stage carry signal Carry (n−4). The eleventh transistor M11 has a first end coupled to the second end of the tenth transistor M10, a second end, and a control end receiving the frequency reduction end signal OED. The twelfth transistor M12 has a first end coupled to the pre-charge node Q(n), a second end receiving the system high voltage VDD, and a control end coupled to the second end of the eleventh transistor M11. The second capacitor C2 is coupled between the first end of the eleventh transistor M11 and the system low voltage VSS.

The output circuit 5 is coupled to the pre-charge node Q(n), and has the pull-down node Qb(n). The output circuit 5 generates the $n^{th}$ stage gate drive signal G(n) and the $n^{th}$ stage carry signal Carry(n) based on an $n^{th}$ stage clock signal CLK(n), an $(n+m)^{th}$ stage carry signal Carry(n+m) (represented by Carry(n+4) in FIG. 3), the voltage level of the pre-charge node Q(n), and the voltage level of the pull-down node Qb(n). A waveform of the $n^{th}$ stage gate drive signal G(n) is the same as a waveform of the $n^{th}$ stage carry signal Carry(n). A quantity of pulses of the $n^{th}$ stage gate drive signal G(n) in a frame display cycle changes with changes of the $n^{th}$ stage clock signal CLK(n), the $(n+m)^{th}$ stage carry signal Carry(n+m), the voltage level of the pre-charge node Q(n), and the voltage level of the pull-down node Qb(n). During the frequency-up drive period, the output circuit 5 increases the quantity of pulses of the $n^{th}$ stage gate drive signal G(n) in the frame display cycle based on the $n^{th}$ stage clock signal CLK(n), the $(n+m)^{th}$ stage carry signal Carry (n+m), the voltage level of the pre-charge node Q(n), and the voltage level of the pull-down node Qb(n). During the frequency reduction drive period, the output circuit 5 decreases the quantity of pulses of the $n^{th}$ stage gate drive signal G(n) in the frame display cycle based on the $n^{th}$ stage clock signal CLK(n), the $(n+m)^{th}$ stage carry signal Carry (n+m), the voltage level of the pre-charge node Q(n), and the voltage level of the pull-down node Qb(n). In this embodiment, the output circuit 5 includes an anti-noise control unit 51, an anti-noise unit 52, a pull-down unit 53, and an output unit 54.

The anti-noise control unit 51 is coupled to the pre-charge node Q(n), and has the pull-down node Qb(n). The anti-noise control unit 51 adjusts, based on the system high voltage VDD and the voltage level of the pre-charge node Q(n), the voltage level of the pull-down node Qb(n) to have the low voltage level or the high voltage level. In this embodiment, the anti-noise control unit 51 includes a thirteenth transistor M13, a fourteenth transistor M14, a fifteenth transistor M15, and a sixteenth transistor M16.

The thirteenth transistor M13 has a first end receiving the system high voltage VDD, a second end, and a control end coupled to the first end of the thirteenth transistor M13. The fourteenth transistor M14 has a first end coupled to the second end of the thirteenth transistor M13, a second end receiving the system low voltage VSS, and a control end coupled to the pre-charge node Q(n). The fifteenth transistor M15 has a first end receiving the system high voltage VDD, a second end coupled to the pull-down node Qb(n), and a control end coupled to the second end of the thirteenth transistor M13. The sixteenth transistor M16 has a first end coupled to the second end of the fifteenth transistor M15, a second end receiving the system low voltage VSS, and a control end coupled to the control end of the fourteenth transistor M14.

The anti-noise unit 52 is coupled to the pre-charge node Q(n) and the pull-down node Qb(n). When the voltage level of the pull-down node Qb(n) has the high voltage level, the anti-noise unit 52 is in a work state, so that each of the $n^{th}$ stage gate drive signal G(n) and the $n^{th}$ stage carry signal Carry(n) has the low potential. When the voltage level of the pull-down node Qb(n) has the low voltage level, the anti-noise unit 52 is in a non-work state. In this embodiment, the anti-noise unit 52 includes a seventeenth transistor M17, an eighteenth transistor M18, and a nineteenth transistor M19.

The seventeenth transistor M17 has a first end coupled to the pre-charge node Q(n), a second end receiving the system low voltage VSS, and a control end coupled to the pull-down node Qb(n). The eighteenth transistor M18 has a first end coupled to the output unit 54, a second end receiving the system low voltage VSS, and a control end coupled to the control end of the seventeenth transistor M17. The nineteenth transistor M19 has a first end coupled to the output unit 54, a second end receiving the system low voltage VSS, and a control end coupled to the control end of the eighteenth transistor M18. When the voltage level of the pull-down node Qb(n) has the high voltage level, the seventeenth transistor M17, the eighteenth transistor M18, and the nineteenth transistor M19 are turned on. In this case, the anti-noise unit 52 is in the work state (that is, in a state of an anti-noise operation). The eighteenth transistor M18 and the nineteenth transistor M19 respectively pull down potentials of the $n^{th}$ stage gate drive signal G(n) and the $n^{th}$ stage carry signal Carry(n) to the system low voltage VSS, so that each of the $n^{th}$ stage gate drive signal G(n) and the $n^{th}$ stage carry signal Carry(n) has a low potential, and the $n^{th}$ stage gate drive signal G(n) and the $n^{th}$ stage carry signal Carry(n) do not cause noise interference to another gate drive signal or carry signal. When the voltage level of the pull-down node Qb(n) has the low voltage level, the seventeenth transistor M17, the eighteenth transistor M18, and the nineteenth transistor M19 are turned off, and the anti-noise unit 52 is in the non-work state (that is, in a state of stopping the anti-noise operation).

The pull-down unit 53 is coupled to the pre-charge node Q(n), and pulls down the voltage level of the pre-charge node Q(n) and the potential of the $n^{th}$ stage gate drive signal G(n) to the system low voltage VSS (that is, correspondingly, the $(n+4)^{th}$ stage carry signal Carry(n+4) has a high potential) based on the $(n+4)^{th}$ stage carry signal Carry(n+4), so that the anti-noise control unit 51 adjusts the voltage level of the pull-down node Qb(n) to have the high voltage level. In this embodiment, the pull-down unit 53 includes a twentieth transistor M20 and a twenty-first transistor M21.

The twentieth transistor M20 has a first end coupled to the pre-charge node Q(n), a second end receiving the system low voltage VSS, and a control end receiving the $(n+4)^{th}$ stage carry signal Carry(n+4). The twenty-first transistor M21 has a first end coupled to the output unit 54, a second end receiving the system low voltage VSS, and a control end receiving the $(n+4)^{th}$ stage carry signal Carry(n+4).

The output unit 54 is coupled to the pre-charge node Q(n), the anti-noise unit 52, and the pull-down unit 53, and generates the $n^{th}$ stage gate drive signal G(n) and the $n^{th}$ stage carry signal Carry(n) based on the $n^{th}$ stage clock signal CLK(n), the voltage level of the pre-charge node Q(n), and a turned-on or turn-off state of each of the anti-noise unit 52 and the pull-down unit 53 (that is, a turned-on or turn-off state of the seventeenth transistor M17 to the twenty-first transistor M21 (M17 to M21)). In this embodiment, the output unit 54 includes a twenty-second transistor M22, a twenty-third transistor M23, and a third capacitor C3.

The twenty-second transistor M22 has a first end receiving the $n^{th}$ stage clock signal CLK(n), a second end providing the $n^{th}$ stage carry signal Carry(n), and a control end coupled to the pre-charge node Q(n). The twenty-third transistor M23 has a first end receiving the $n^{th}$ stage clock signal CLK(n), a second end providing the $n^{th}$ stage gate drive signal G(n), and a control end coupled to the control end of the twenty-second transistor M22. A third capacitor C3 is coupled between the control end of the twenty-third transistor M23 and the second end.

It should be noted that, the transistor 21 and the first transistor M1 to the twenty-third transistor M23 (M1 to M23) are respectively an n-type metal-oxide-semiconductor field-effect transistor, and drains, sources, and gates are respectively the first end, the second end, and the control end of each of the transistor 21 and the first transistor M1 to the twenty-third transistor M23 (M1 to M23).

Figure 4:
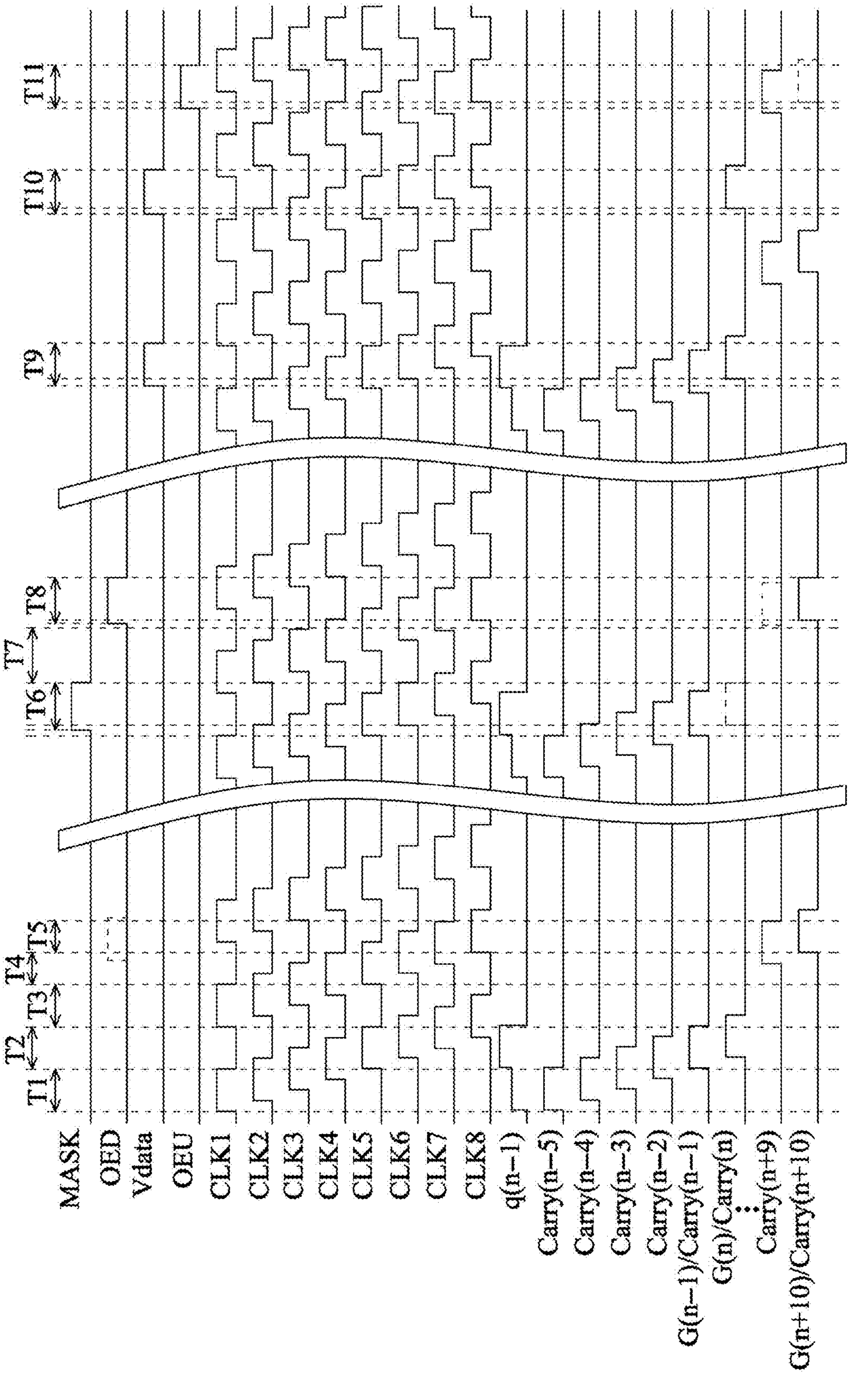
FIG. 4 is a partial sequence diagram of a gate driving device according to this embodiment.

Refer to FIG. 3 and FIG. 4 together. FIG. 4 is a partial sequence diagram of a gate driving device according to this embodiment of the present disclosure. The following describes an operation manner of the gate driving device 1 during the normal drive period, the frequency-up drive period, and the frequency reduction drive period. Time intervals T1, T2, T3, and T4 are used as the normal drive periods, time intervals T5, T6, and T7 are used as frequency reduction drive periods, and time intervals T9 and T10 are used as frequency-up drive periods, but this is not limited thereto. FIG. 4 shows an example in which an $(n-1)^{th}$ stage gate driving unit (n in FIG. 3 is replaced with n−1, that is, an $(n-1)^{th}$ stage gate driving unit GU(n−1)) describes an operation during the normal drive period, and the $n^{th}$ stage gate driving unit GU(n) describes an operation of starting to perform frequency-up or frequency reduction, but this application is not limited thereto. Therefore, in the following time intervals T1, T2, T3, and T4, n in FIG. 3 is replaced with n−1 for description.

In the time interval T1, the transistor 21, the thirteenth transistor M13 to the sixteenth transistor M16 (M13 to M16), the twenty-second transistor M22, and the twenty-third transistor M23 are turned on, and the first transistor M1 to the twelfth transistor M12 (M1 to M12) and the seventeenth transistor M17 to the twenty-first transistor M21 (M17 to M21) are turned off.

Specifically, in the time interval T1, an $(n-5)^{th}$ stage carry signal Carry(n−5) is at a high potential, so that the transistor 21 is turned on. In this case, the system high voltage VDD is written to the pre-charge node Q(n−1) through the transistor 21 for pre-charging, so that the voltage level q(n−1) of the pre-charge node Q(n−1) is charged to the high voltage level, and the twenty-second transistor M22 and the twenty-third transistor M23 are turned on. In this case, an $(n-1)^{th}$ stage clock signal CLK(n−1) (corresponding to a clock signal CLK5 shown in FIG. 4) is at a low potential, so that the (n−1)$^{th}$ stage gate driving unit GU(n−1) outputs the (n−1)$^{th}$ stage gate drive signal G(n−1) and the (n−1)$^{th}$ stage carry signal Carry(n−1) having the low potential. In addition, because the voltage level q(n−1) of the pre-charge node Q(n−1) is charged to the high voltage level, the fourteenth transistor M14 and the sixteenth transistor M16 are turned on, so that the voltage level of the pull-down node Qb(n−1) is pulled down to the system low voltage VSS, so that the seventeenth transistor M17 to the nineteenth transistor M19 (M17 to M19) are turned off. In this case, the anti-noise unit 52 is in the non-work state.

In the time interval T2, the thirteenth transistor M13 to the sixteenth transistor M16 (M13 to M16), the twenty-second transistor M22, and the twenty-third transistor M23 are turned on, and the transistor 21, the first transistor M1 to the twelfth transistor M12 (M1 to M12), and the seventeenth transistor M17 to the twenty-first transistor M21 (M17 to M21) are turned off.

Specifically, in the time interval T2, the (n−1)$^{th}$ stage clock signal CLK(n−1) (corresponding to the clock signal CLK5 shown in FIG. 4) changes from the low potential to the high potential, and the pre-charge node Q(n−1) increases the voltage level q(n−1) of the pre-charge node because of a capacitive coupling effect, so that the twenty-second transistor M22 and the twenty-third transistor M23 remain turned on. Because the (n−1)$^{th}$ stage clock signal CLK(n−1) is at the high potential, in this case, the (n−1)$^{th}$ stage gate driving unit GU(n−1) outputs the (n−1)$^{th}$ stage gate drive signal G(n−1) having the high potential through the twenty-third transistor M23 that is turned on, and the (n−1)$^{th}$ stage gate driving unit GU(n−1) outputs the (n−1)$^{th}$ stage carry signal Carry(n−1) having the high potential through the twenty-second transistor M22 that is turned on, to push next-stage pre-charging. In this case, because the voltage level q(n−1) of the pre-charge node Q(n−1) is maintained at the high voltage level, the fourteenth transistor M14 and the sixteenth transistor M16 remain turned on, so that the voltage level of the pull-down node Qb(n−1) is continuously pulled down to the system low voltage VSS, and the seventeenth transistor M17 to the nineteenth transistor M19 (M17 to M19) are continuously turned off, to cause the anti-noise unit 52 to be continuously in the non-work state.

In the time interval T3, the thirteenth transistor M13, the fifteenth transistor M15, and the seventeenth transistor M17 to the twenty-first transistor M21 (M17 to M21) are turned on, and the transistor 21, the first transistor M1 to the twelfth transistor M12 (M1 to M12), the fourteenth transistor M14, the sixteenth transistor M16, the twenty-second transistor M22, and the twenty-third transistor M23 are turned off.

Specifically, in the time interval T3, because an (n+3)$^{th}$ stage carry signal Carry(n+3) turns to be at the high potential (not shown in the figure), the twentieth transistor M20 and the twenty-first transistor M21 are turned on, thereby pulling down the (n−1)$^{th}$ stage gate drive signal G(n−1) and the voltage level q(n−1) of the pre-charge node Q(n−1) to the system low voltage VSS. Because the voltage level q(n−1) of the pre-charge node Q(n−1) is pulled down to the system low voltage VSS, the fourteenth transistor M14 and the sixteenth transistor M16 are turned off. In this case, the thirteenth transistor M13 and the fifteenth transistor M15 are turned on, so that the voltage level of the pull-down node Qb(n−1) is charged to the high voltage level by the system high voltage VDD, the seventeenth transistor M17 to the nineteenth transistor M19 (M17 to M19) are turned on, and the anti-noise unit 52 is in the work state. Therefore, in the time interval T3, the (n−1)$^{th}$ stage gate driving unit GU(n−1) outputs the (n−1)$^{th}$ stage gate drive signal G(n−1) having the low potential and the (n−1)$^{th}$ stage carry signal Carry(n−1).

In the time interval T4, the thirteenth transistor M13, the fifteenth transistor M15, and the seventeenth transistor M17 to the nineteenth transistor M19 (M17 to M19) are turned on, and the transistor 21, the first transistor M1 to the twelfth transistor M12 (M1 to M12), the fourteenth transistor M14, the sixteenth transistor M16, and the twentieth transistor M20 to the twenty-third transistor M23 (M20 to M23) are turned off.

Specifically, in the time interval T4, because the voltage level q(n−1) of the pre-charge node Q(n−1) is maintained at a low voltage level, the voltage level of the pull-down node Qb(n−1) is maintained at a high voltage level, so that the seventeenth transistor M17 to the nineteenth transistor M19 (M17 to M19) are continuously turned on. In this way, it is ensured that the (n−1)$^{th}$ stage gate driving unit GU(n−1) continuously outputs the n$^{th}$ stage gate drive signal G(n−1) and the n$^{th}$ stage carry signal Carry(n−1) having the low potential, and the (n−1)$^{th}$ stage gate drive signal G(n−1) and the (n−1)$^{th}$ stage carry signal Carry(n−1) do not cause noise interference to another gate drive signal or carry signal. This design implements a full-time anti-noise mechanism, to ensure that the circuit can still maintain stable operation in a non-session, thereby improving overall anti-interference capability and reliability.

In the time interval T5, the transistor 21, the ninth transistor M9 to the sixteenth transistor M16 (M9 to M16), the twenty-second transistor M22, and the twenty-third transistor M23 are turned on, and the first transistor M1 to the eighth transistor M8 (M1 to M8) and the seventeenth transistor M17 to the twenty-first transistor M21 (M17 to M21) are turned off.

Specifically, in the time interval T5, this is a preparation stage of the frequency reduction mechanism, and stores a necessary state for a playback level (for example, the n$^{th}$ stage gate driving unit GU(n)) on which frequency reduction is to be performed. During a previous frame pre-charging phase of the playback level after frequency reduction is to be performed, a high potential is stored for a node Md(n) of the second capacitor C2 through the (n−4)$^{th}$ stage carry signal Carry(n−4) and the frequency reduction end signal OED (for example, a high potential is stored for the node Md(n) of the second capacitor C2 by using a partially overlapped high voltage of the frequency reduction end signal OED and a previous fourth stage (not shown in the figure, if the playback level is Carry(n+10), the previous fourth stage thereof is Carry(n+6))), and a quantity of levels of the gate driving unit for recharging after frequency reduction is memorized.

In the time interval T6, the transistor 21, the seventh transistor M7, the eighth transistor M8, the thirteenth transistor M13, the fifteenth transistor M15, and the seventeenth transistor M17 to the nineteenth transistor M19 (M17 to M19) are turned on, and the first transistor M1 to the sixth transistor M6 (M1 to M6), the ninth transistor M9 to the twelfth transistor M12 (M9 to M12), the fourteenth transistor M14, the sixteenth transistor M16, and the twentieth transistor M20 to the twenty-third transistor M23 (M20 to M23) are turned off.

Specifically, in the time interval T6, that is, an execution point at which the frequency reduction starts, the mask signal MASK turns to be at the high potential, and in this case, the (n−4)$^{th}$ stage clock signal CLK(n−4) (shown by a corresponding clock signal CLK6 in FIG. 4) turns to be at the high potential. Therefore, the seventh transistor M7 and the eighth transistor M8 are turned on, and charge the pull-down node Qb(n), so that the voltage level of the pull-down node Qb(n) is the high voltage level, to cause the seventeenth transistor M17 to be turned on. In addition, the voltage level of the pre-charge node Q(n) is pulled down to the system low voltage VSS, so that pre-charging of the pre-charge node Q(n) of a start level of the frequency reduction (that is, the $n^{th}$ stage gate driving unit GU(n)) cannot be completed, that is, the twenty-second transistor M22 and the twenty-third transistor M23 are turned off. Therefore, the $n^{th}$ stage gate driving unit GU(n) cannot output the $n^{th}$ stage gate drive signal G(n) and the $n^{th}$ stage carry signal Carry(n) having the high potential, thereby ensuring stable operation of a frequency reduction process, and effectively reducing a display frequency.

In the time interval T7, the thirteenth transistor M13, the fifteenth transistor M15, and the seventeenth transistor M17 to the nineteenth transistor M19 (M17 to M19) are turned on, and the transistor 21, the first transistor M1 to the twelfth transistor M12 (M1 to M12), the fourteenth transistor M14, the sixteenth transistor M16, and the twentieth transistor M20 to the twenty-third transistor M23 (M20 to M23) are turned off.

Specifically, in the time interval T7, because the $n^{th}$ stage gate driving unit GU(n) stops outputting the $n^{th}$ stage carry signal Carry(n) in the time interval T6, gate driving units of subsequent levels are not pushed for pre-charging in the time interval T7 (that is, the $(n+1)^{th}$ stage carry signal Carry(n+1) to the $(n+9)^{th}$ stage carry signal Carry(n+9) shown in FIG. 4 all have the low potential), so that the gate driving device 1 keeps running of the frequency reduction function.

In the time interval T8, the eleventh transistor M11 to the sixteenth transistor M16 (M11 to M16), the twenty-second transistor M22, and the twenty-third transistor M23 are turned on, and the transistor 21, the first transistor M1 to the tenth transistor M10 (M1-M10), and the seventeenth transistor M17 to the twenty-first transistor M21 (M17-M21) are turned off.

Specifically, in the time interval T8, when the frequency reduction drive period ends, the eleventh transistor M11 of the gate driving unit currently corresponding to the level is turned on by enabling the frequency reduction end signal OED to be at the high potential, and the twelfth transistor M12 is driven to be turned on through the high potential of the node (Md(n)), so that the system high voltage VDD is written into the twelfth transistor M12 and the pre-charge node (Q(n)) again, and the gate driving device 1 recovers to output a gate drive signal (an $(n+10)^{th}$ stage gate drive signal G(n+10) as shown in FIG. 4) and a carry signal (an $(n+10)^{th}$ stage carry signal Carry(n+10) as shown in FIG. 4), to complete drive recovery, so that the gate driving device 1 outputs a sequential square wave signal again to restore normal frequency driving, to sequentially turn on a scanning line connected to the display panel.

In the time interval T9, the transistor 21, the first transistor M1 to the fourth transistor M4 (M1 to M4), the thirteenth transistor M13 to the sixteenth transistor M16 (M13 to M16), the twenty-second transistor M22, and the twenty-third transistor M23 are turned on, and the fifth transistor M5 to the twelfth transistor M12 (M5 to M12) and the seventeenth transistor M17 to the twenty-first transistor M21 (M17 to M21) are turned off.

Specifically, in the time interval T9, this is a preparation stage of a frequency-up mechanism, and stores a necessary state for the playback level (for example, the $n^{th}$ stage gate driving unit) on which frequency-up is to be performed. During a previous frame pre-charging phase of the playback level which frequency-up is to be performed, a high potential is stored for a node Mu(n) of the first capacitor C1 through the $(n-4)^{th}$ stage carry signal Carry(n−4) and the frequency-up indication signal Vdata (for example, a high potential is stored for the node Mu(n) of the first capacitor C1 by using a partially overlapped high voltage of the frequency-up indication signal Vdata and the previous fourth stage) (if the playback level is Carry(n), the previous fourth stage thereof is Carry(n−4), and if the playback level is Carry(n+10), the previous fourth stage thereof is Carry (n+6)), and a number of levels of the gate driving unit for charging in frequency-up is memorized.

In the time interval T10, the third transistor M3, the fourth transistor M4, the thirteenth transistor M13 to the sixteenth transistor M16 (M13 to M16), the twenty-second transistor M22, and the twenty-third transistor M23 are turned on, and the transistor 21, the first transistor M1, the second transistor M2, the fifth transistor M5 to the twelfth transistor M12 (M5 to M12), and the seventeenth transistor M17 to the twenty-first transistor M21 (M17 to M21) are turned off.

Specifically, in the time interval T10, because the frequency-up indication signal Vdata turns to be at the high potential, the third transistor M3 is turned on, so that the high potential of the node Mu(n) drives the fourth transistor M4 to be turned on, so that the system high voltage VDD is written into the fourth transistor M4 and the pre-charge node Q(n) is re-precharged, and the $n^{th}$ stage gate driving unit GU(n) outputs the $n^{th}$ stage gate drive signal G(n) and the $n^{th}$ stage carry signal Carry(n) having the high potential again, thereby improving the display frequency.

In the time interval T11, the transistor 21, the fifth transistor M5, the sixth transistor M6, and the thirteenth transistor M13 to the nineteenth transistor M19 (M13 to M19) are turned on, and the first transistor M1 to the fourth transistor M4 (M1 to M4), the seventh transistor M7 to the twelfth transistor M12 (M7 to M12), and the twentieth transistor M20 to the twenty-third transistor M23 (M20 to M23) are turned off.

Specifically, in the time interval T11, when the frequency-up drive period ends, the frequency-up end signal OEU and the clock signal received by the control end of the sixth transistor M6 of the corresponding level of the gate driving unit are at the high potential, so that the voltage level of the pull-down node (Qb(n)) of the corresponding level of the gate driving unit is charged to the high voltage level, and the seventeenth transistor M17 is turned on. In addition, the voltage level of the corresponding pre-charge node (Q(n)) is pulled down to the system low voltage VSS. Consequently, the pre-charge node (Q(n)) of the level of the gate driving unit cannot be pre-charged. Further, the level of the gate driving unit outputs a gate drive signal (the $(n+10)^{th}$ stage gate drive signal G(n+10) shown in FIG. 4) and a carry signal (the $(n+10)^{th}$ stage carry signal Carry(n+10) shown in FIG. 4) having the low potential. to end a frequency-up function operation of the gate driving device 1.

Figure 5:
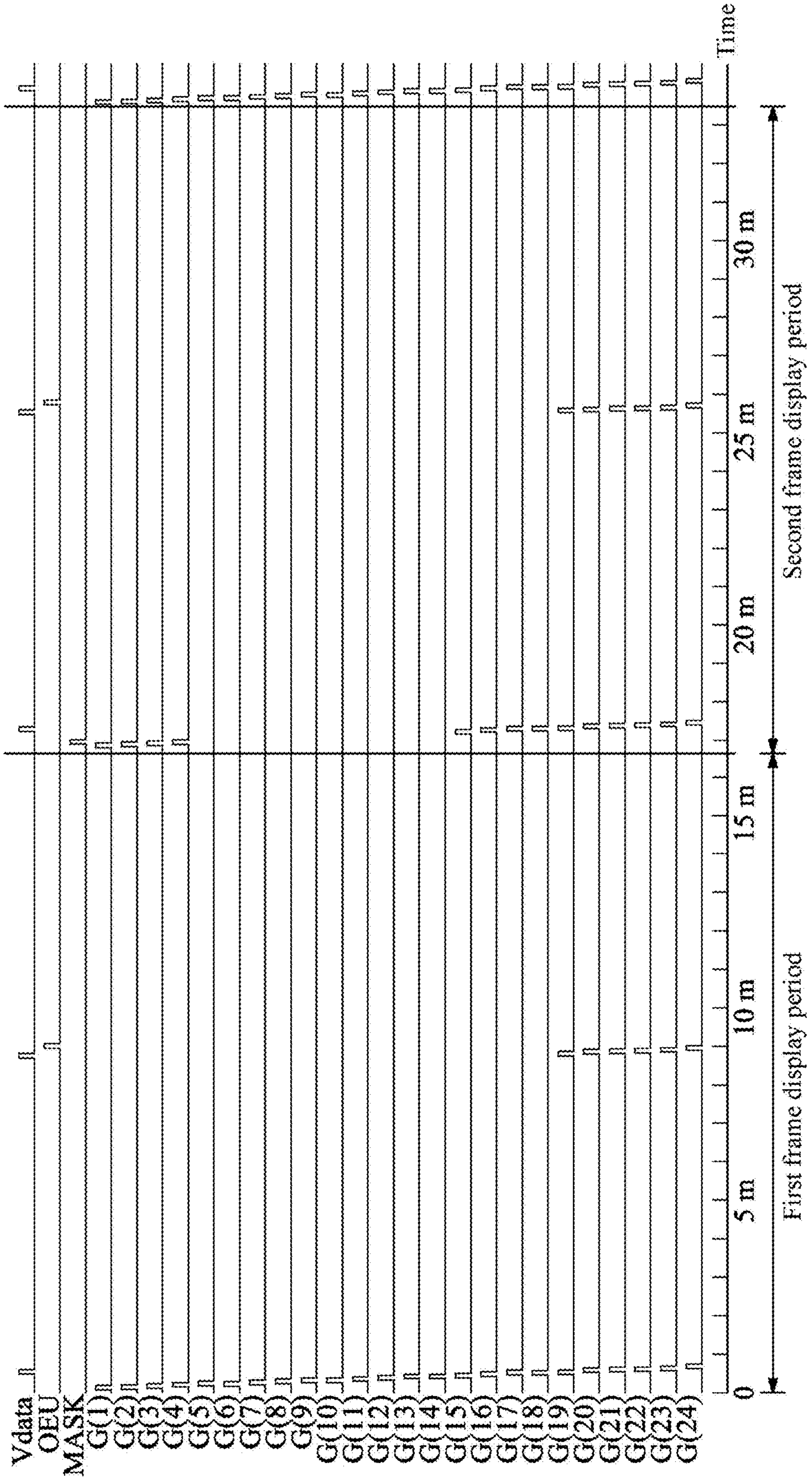
FIG. 5 is a partial waveform simulation diagram of a gate driving device according to this embodiment.

Referring to FIG. 5, FIG. 5 is a partial waveform simulation diagram of a gate driving device 1 according to the present disclosure. As shown in FIG. 5, during the normal drive period, the display frequency (or referred to as the refresh rate) of the display panel in a display that is driven by the gate driving device 1 is 60 Hz (as shown by gate drive signals G(1) to G(4) and gate drive signals G(15) to G(18) in FIG. 5), a display area (or referred to as an image region) changing at a high speed may be randomly selected through an operation in the foregoing frequency-up drive period to increase the display frequency from 60 Hz to 120 Hz (as shown by gate drive signals G(19) to G(24) in FIG. 5), and a display area changing at a low speed (or static) may be randomly selected through an operation in the foregoing frequency reduction drive period to decrease the display frequency from 60 Hz to 30 Hz (as shown by gate drive signals G(5) to G(14) in FIG. 5), thereby implementing that the gate driving device 1 can dynamically adjust the refresh rate of the display panel according to display requirements of different display areas, and implementing coexistence of a high refresh rate and a low refresh rate in a same display image.

In conclusion, the gate driving device 1 that can improve a refresh rate in a display area with a high dynamic change is provided, to improve overall display quality of a display panel in a display, and can reduce a refresh frequency in a display area with a static or low dynamic change, so that unnecessary charging and discharging times are reduced to reduce dynamic power consumption. In this way, not only dynamic power consumption control is optimized and energy efficiency of the display is improved, but also image stability and visual smoothness of the display panel are ensured.

The foregoing descriptions are merely embodiments of the present disclosure, and cannot limit the scope of implementation of the present disclosure. Simple equivalent changes and modifications made according to the patent scope and content of the specification of the present disclosure shall fall within the patent scope of the present disclosure.

While the present disclosure has been described by means of specific embodiments, numerous modifications and variations could be made thereto by those skilled in the art without departing from the scope and spirit of the present disclosure set forth in the claims.

What is claimed is:

1. A gate driving device for dynamically adjusting a refresh rate of each display area of a display panel, comprising:

a plurality of gate driving units, wherein an $n^{th}$ stage gate driving unit of the gate driving units comprises:

a frequency increasing circuit, coupled to a pre-charge node and a pull-down node, and configured to respectively adjust, based on a system high voltage, an $(n-m)^{th}$ stage carry signal, and a frequency-up indication signal during a frequency-up drive period, a voltage level of the pre-charge node and a voltage level of the pull-down node to have a high voltage level and a low voltage level, wherein the frequency-up indication signal changes with a high-speed change of each image region of a to-be-displayed picture, each of n and m is a positive integer, and n−m is greater than or equal to 1;

a frequency decreasing circuit, coupled to the pre-charge node and the pull-down node, and configured to respectively adjust, based on a mask signal and an $(n-m)^{th}$ stage clock signal during a frequency reduction drive period, the voltage level of the pre-charge node and the voltage level of the pull-down node to have the low voltage level and the high voltage level, wherein the mask signal changes with a low-speed change of each image region of the to-be-displayed picture; and an output circuit, coupled to the pre-charge node, having the pull-down node, and configured to generate an $n^{th}$ stage gate drive signal and an $n^{th}$ stage carry signal based on an $n^{th}$ stage clock signal, an $(n+m)^{th}$ stage carry signal, the voltage level of the pre-charge node, and the voltage level of the pull-down node, wherein a quantity of pulses of the $n^{th}$ stage gate drive signal in a frame display cycle changes with changes of the $n^{th}$ stage clock signal, the $(n+m)^{th}$ stage carry signal, the voltage level of the pre-charge node, and the voltage level of the pull-down node.

2. The gate driving device according to claim 1, wherein:

during the frequency-up drive period, the output circuit increases the quantity of pulses of the $n^{th}$ stage gate drive signal in the frame display cycle based on the $n^{th}$ stage clock signal, the $(n+m)^{th}$ stage carry signal, the voltage level of the pre-charge node, and the voltage level of the pull-down node; and during the frequency reduction drive period, the output circuit reduces the quantity of pulses of the $n^{th}$ stage gate drive signal in the frame display cycle based on the $n^{th}$ stage clock signal, the $(n+m)^{th}$ stage carry signal, the voltage level of the pre-charge node, and the voltage level of the pull-down node.

3. The gate driving device according to claim 1, wherein the frequency increasing circuit comprises:

a frequency-up unit, coupled to the pre-charge node, and configured to adjust, based on the system high voltage, the $(n-m)^{th}$ stage carry signal, and the frequency-up indication signal during the frequency-up drive period, the voltage level of the pre-charge node to have the high voltage level, to enable the voltage level of the pull-down node to be adjusted to have the low voltage level; and a frequency-up end unit, coupled to the pull-down node, and configured to adjust, based on a frequency-up end signal and the $(n-m)^{th}$ stage clock signal when the frequency-up drive period ends, the voltage level of the pull-down node to have the high voltage level, to enable the voltage level of the pre-charge node to be adjusted to have the low voltage level.

4. The gate driving device according to claim 3, wherein the frequency-up unit comprises:

a first transistor, having a first end receiving the frequency-up indication signal, a second end, and a control end receiving the $(n-m)^{th}$ stage carry signal;

a second transistor, having a first end coupled to the second end of the first transistor, a second end, and a control end receiving the $(n-m)^{th}$ stage carry signal;

a third transistor, having a first end coupled to the second end of the second transistor, a second end, and a control end receiving the frequency-up indication signal;

a fourth transistor, having a first end receiving the system high voltage, a second end coupled to the pre-charge node, and a control end coupled to the second end of the third transistor; and a first capacitor, coupled between the first end of the third transistor and a system low voltage.

5. The gate driving device according to claim 3, wherein the frequency-up end unit comprises:

a fifth transistor, having a first end coupled to the pull-down node, a second end, and a control end receiving the frequency-up end signal; and a sixth transistor, having a first end coupled to the second end of the fifth transistor, a second end, and a control end coupled to the second end of the sixth transistor and receiving the $(n-m)^{th}$ stage clock signal.

6. The gate driving device according to claim 1, wherein the frequency decreasing circuit comprises:

a frequency reduction unit, coupled to the pull-down node, and configured to adjust, based on the mask signal and the $(n-m)^{th}$ stage clock signal during the frequency reduction drive period, the voltage level of the pull-down node to have the high voltage level, to enable the voltage level of the pre-charge node to be adjusted to have the low voltage level; and a frequency reduction end unit, coupled to the pre-charge node, and configured to adjust, based on the system high voltage, the $(n-m)^{th}$ stage carry signal, and a frequency reduction end signal when the frequency reduction drive period ends, the voltage level of the pre-charge node to have the high voltage level.

7. The gate driving device according to claim 6, wherein the frequency reduction unit comprises:

a seventh transistor, having a first end, a second end, and a control end coupled to the second end of the seventh transistor and receiving the $(n-m)^{th}$ stage clock signal; and an eighth transistor, having a first end coupled to the second end of the seventh transistor, a second end coupled to the pull-down node, and a control end receiving the mask signal.

8. The gate driving device according to claim 6, wherein the frequency reduction end unit comprises:

a ninth transistor, having a first end receiving the frequency reduction end signal, a second end, and a control end receiving the $(n-m)^{th}$ stage carry signal;

a tenth transistor, having a first end coupled to the second end of the ninth transistor, a second end, and a control end receiving the $(n-m)^{th}$ stage carry signal;

an eleventh transistor, having a first end coupled to the second end of the tenth transistor, a second end, and a control end receiving the frequency reduction end signal;

a twelfth transistor, having a first end coupled to the pre-charge node, a second end receiving the system high voltage, and a control end coupled to the second end of the eleventh transistor; and a second capacitor, coupled between the first end of the eleventh transistor and a system low voltage.

9. The gate driving device according to claim 6, further comprising:

a control unit, coupled to the gate driving units, and configured to generate the frequency-up indication signal, the frequency-up end signal, the mask signal, and the frequency reduction end signal based on image data of the to-be-displayed picture.

10. The gate driving device according to claim 1, wherein the $n^{th}$ stage gate driving unit further comprises:

a power supply circuit, coupled to the pre-charge node, and configured to charge a low voltage value of the pre-charge node to a high voltage value based on the $(n-m)^{th}$ stage carry signal and the system high voltage during a normal drive period.

11. The gate driving device according to claim 1, wherein the output circuit comprises:

an anti-noise control unit, coupled to the pre-charge node and having the pull-down node, wherein the anti-noise control unit is configured to adjust, based on the system high voltage and the voltage level of the pre-charge node, the voltage level of the pull-down node to have the low voltage level or the high voltage level;

an anti-noise unit, coupled to the pre-charge node and the pull-down node, wherein the anti-noise unit is in a work state when the voltage level of the pull-down node has the high voltage level, to enable each of the $n^{th}$ stage gate drive signal and the $n^{th}$ stage carry signal to have a low potential, and the anti-noise unit is in a non-work state when the voltage level of the pull-down node has the low voltage level;

a pull-down unit, coupled to the pre-charge node, and configured to pull down the voltage level of the pre-charge node and a potential of the $n^{th}$ stage gate drive signal to a system low voltage based on the $(n+m)^{th}$ stage carry signal, to enable the anti-noise control unit to adjust the voltage level of the pull-down node to have the high voltage level; and an output unit, coupled to the pre-charge node, the anti-noise unit, and the pull-down unit, and configured to generate the $n^{th}$ stage gate drive signal and the $n^{th}$ stage carry signal based on the $n^{th}$ stage clock signal, the voltage level of the pre-charge node, and a turned-on or turn-off state of each of the anti-noise unit and the pull-down unit.

* * * * *